United States Patent [19]

Diekötter

[11] 4,422,946
[45] Dec. 27, 1983

[54] CALCINED α-ALUMINA FILTER AIDS

[75] Inventor: Friedrich W. Diekötter, Langenfeld, Fed. Rep. of Germany

[73] Assignee: Henkel KGaA, Duesseldorf, Fed. Rep. of Germany

[21] Appl. No.: 379,107

[22] Filed: May 17, 1982

[30] Foreign Application Priority Data

Jun. 3, 1981 [DE] Fed. Rep. of Germany ....... 3121953

[51] Int. Cl.$^3$ ........................................... B01D 37/02
[52] U.S. Cl. .................................... 210/777; 210/778
[58] Field of Search ............................... 210/777, 778

[56] References Cited

U.S. PATENT DOCUMENTS 3,244,407 4/1966 Obergfell et al. ................... 210/778
3,259,471 7/1966 Cortessis et al. ................... 210/777

FOREIGN PATENT DOCUMENTS 2409634 9/1974 Fed. Rep. of Germany .

OTHER PUBLICATIONS

Ullmann's Encyklopädie der technischen Chemie, 4th Ed., vol. 2 (1972), pp. 195 and 196.
Kirk–Othmer, Encyclopedia of Chemical Technology, 3rd Ed., vol. 10 (1980), p. 296.
Kirk–Othmer, Encyclopedia of Chemical Technology, 3rd Ed., vol. 2 (1978), p. 237.
Ullmann's Encyklopädie der technischen Chemie, 4th Ed., vol. 7 (1974), p. 327.

Primary Examiner—Ivars C. Cintins
Attorney, Agent, or Firm—Ernest G. Szoke; Henry E. Millson, Jr.

[57] ABSTRACT

A process for filtering alkaline solutions wherein calcined α-alumina is used as a filter aid.

9 Claims, No Drawings

CALCINED α-ALUMINA FILTER AIDS

BACKGROUND OF THE INVENTION

It is known that when filtering liquids, filter aids (so-called "precoats") are often used in addition to the usual filter membranes and devices. Filter aids help to trap fine particles of foreign materials present in the liquids to be filtered. The solid particles contained in the liquids will adhere to the filter aid, while leaving enough open spaces for the filtrate to pass through. In addition, the filter aids can also be used to produce a filter cake prior to the filtration process. This filter cake is sufficiently permeable to permit liquid but not solid particles to pass through it. Additional quantities of the filter aid can also be added to the liquid to be filtered, in addition to the use of the filter cake.

The most commonly used filter aids are Kieselgur, perlite, and cellulose fibers, and these filter aids are considered to be superior to other filter aids (Ullman's Encyklopädie der technischen Chemie, 4th ed., Vol. 2 (1972), pages 195 and 196, Kirk-Othmer, Encyclopedia of Chemical Technology, 3rd ed., Vol. 10 (1980) page 296.

It was found that when using Kieselgur and perlite as filter aids with alkaline solutions, in particular strong alkaline solutions, such filter aids were attacked by the solutions. This effect is very pronounced when filtering hot alkaline solutions, especially in a temperature range of about 80° to about 100° C. It can be shown that when filtering sodium aluminate solution, Kieselgur as well as perlite react with the aluminate solution to form sodium aluminum silicates. This causes the mesh of the filter, e.g. a wire mesh filter, to clog, and the filter cake will harden after contact with the solution within one day of its use, resulting in time consuming cleaning operations. Even cellulose fibers cannot withstand very strong alkaline solutions.

Coal can be used as a filter aid to produce clear strongly alkaline solutions; however, the price of powdered coal is much higher than that of Kieselgur or perlite. In addition, after having used coal as a filter aid, extensive cleaning operations in the filtering plant are required following the filtering step.

Hence, there is an unfilled need for a filter aid material that compares favorably, pricewise, to Kieselgur and perlite; and which does not clog the filter cake or the filter itself when filtering alkaline solutions, particularly hot strongly alkaline solutions.

Porous bodies of α-aluminum oxide are known to the art. German Patent No. DE-OS 24 09 634 describes a porous body of α-aluminum oxide with a crystalline structure; this body has a number of channels traversing its entire thickness. The diameter of these channels is smaller than 0.01 μm in at least one section thereof. Such a body can be made of aluminates of the β-aluminum oxide type. These aluminates are heated to a temperature just below the melting point of the aluminate, and above the sublimation temperature of the metal oxides comprising the aluminate. Kirk-Othmer, Encyclopedia of Chemical Technology, 3rd ed., Vol. 2 (1978), page 237, mentions the application of sintered aluminum oxide as a filter aid for molten metal, and Ullmann's Encyklopädie der technischen Chemie, 4th ed., Vol. 7 (1974), page 327, describes the application of active aluminum oxides as filter aids.

None of these references suggest or describe the use of calcined α-aluminum oxide as a filter aid.

DETAILED DESCRIPTION OF THE INVENTION

It has now been found that finely divided calcined α-aluminum oxide is an effective filter aid for use with alkaline solutions, especially for use with strongly alkaline solutions. Calcined α-aluminum oxide is much preferred for use with hot aluminate solutions, especially sodium or potassium aluminate solutions at a temperature range of about 80° C. to about 100° C. The present filter aid is used mainly for the removal of solid contaminants that cloud the alkaline solutions. The quantity of calcined α-aluminum oxide to be used with any particular alkaline solution can be readily determined by preliminary experiments to find the optimum quantity thereof, and as is obvious to those skilled in the art, is in part dependent on the quantity of particles of foreign matter present in the solution.

It has been discovered that calcined α-aluminum oxide is inert to hot strongly alkaline solutions. In any event, when used with aluminate solutions, even if minute quantities of the filter aid were to be dissolved by the solutions, they would not contaminate the filtrate since aluminates would be the only reaction products formed.

The calcined α-aluminum oxide ($Al_2O_3$) is manufactured by calcining aluminum oxide. The calcining temperatures are usually from about 1200° C. to about 1850° C. The calcined α-aluminum oxide is then ground into the desired particle size. When using it as a filter aid, the particle size and grading chosen will depend on the solutions and filtering equipment with which it is to be used, and such determinations can readily be made by those skilled in the art.

The calcined α-aluminum oxide can be used with a variety of filters, such as sieves, cloth, felt, fleece, porous materials and membranes. Drum filters can be used or other filters, with or without pressure, and even under vacuum.

The invention will be more clearly understood from the following examples which are given for illustration purposes only and not to limit the invention.

EXAMPLE 1

This example illustrates the filtration process of the invention using laboratory-type filtering equipment.

A column having 250 ml of useable volume was used as the filtering apparatus. Attached to its lower end was an exchangeable filter mesh of 80 μm mesh size. The entire column was enveloped by a heating mantle using 90° C. hot water. Before starting the filtration, the mesh was covered with a filter bed consisting of calcined α-$Al_2O_3$ as a filter aid. 0.285 g of this filter aid was used per 5.7 cm² of filter surface. The column was then filled with 200 ml of cloudy sodium aluminate at a temperature of about 90° C., and containing a suspension of 1 g/l of calcined α-$Al_2O_3$ as a filter aid. The filter aid suspended in the aluminate solution helps to prevent clogging of the filter bed or filter cake. After filling the column, a positive pressure of 1 bar was applied using nitrogen. The transit time through the column was measured; the rate of filtration amounted to about 6 m³ of solution per 1 m² of filter surface per hour. The filtration yielded a clear filtrate.

EXAMPLE 2

A total filter surface of 15 m², distributed over 20 filters, was employed using a fresh mesh of 80 μm mesh size. About 0.5 to 1 kg of calcined $\alpha$-$Al_2O_3$/m² of filter surface was placed on the filter mesh. A cloudy sodium aluminate solution at 90° C., which did not contain any additional calcined $\alpha$-$Al_2O_3$, was passed through the filters at a pressure of from 1 to 2 bars. The amount of filtrate obtained was 15 to 20 m³/hour. Even under these conditions a clear filtrate was obtained.

What is claimed is:

1. A process for filtering an alkaline solution to remove solid contaminants therefrom comprising the steps of
   (a) passing the alkaline solution containing solid contaminants through a filter in the presence of calcined $\alpha$-aluminum oxide as a filter aid to produce a clear filtrate; and
   (b) recovering the clear filtrate produced by step (a).
2. A process in accordance with claim 1 wherein the calcined $\alpha$-aluminum oxide is present as a filter cake on the surface of the filter through which the alkaline solution is to be passed.
3. A process in accordance with claim 1 or 2 wherein a quantity of calcined $\alpha$-aluminum oxide is mixed with said alkaline solution prior to filtering the solution.
4. A process in accordance with claim 1 or 2 wherein the alkaline solution is strongly alkaline.
5. A process in accordance with claim 3 wherein the alkaline solution is strongly alkaline.
6. A process in accordance with claim 4 wherein the alkaline solution is a hot solution of sodium or potassium aluminate.
7. A process in accordance with claim 5 wherein the alkaline solution is a hot solution of sodium or potassium aluminate.
8. A process in accordance with claim 1 or 2 wherein the calcined $\alpha$-aluminum oxide was calcined at a temperature of from about 1200° C. to about 1850° C.
9. A process in accordance with claim 3 wherein the calcined $\alpha$-aluminum oxide was calcined at a temperature of from about 1200° C. to about 1850° C.

* * * * *